United States Patent Office 2,848,434
Patented Aug. 19, 1958

2,848,434

HYDROSOLS PREPARED BY POLYMERIZING TWO MONOMERS IN THE PRESENCE OF A COPOLYMER

Richard J. Hellmann, Rochester, N. Y., assignor to Eastman Kodak Company, Rochester, N. Y., a corporation of New Jersey No Drawing. Application July 20, 1954
Serial No. 444,651

6 Claims. (Cl. 260—45.5)

This invention relates to hydrosols which are compatible with or substitutes for natural hydrophilic colloids such as gelatin prepared by copolymerizing an alkyl acrylate or methacrylate with either a styrene or acrylonitrile, in the presence of an aqueous solution of a copolymer of methacrylamide and acrylic acid.

Natural occurring hydrophilic colloids such as gelatin have had wide application in various manufactures, particularly in photographic materials where a water permeable colloid emulsion or layer is very essential. However, due to the nonuniformity of colloids such as gelatin and properties such as brittleness when coated to appreciable thickness layers, such colloids have not been entirely successful for certain purposes. Attempts have, therefore, been made to improve gelatin, and the like, by addition of elastic materials or other modifying agents or to replace completely the natural colloids by synthetic resins. A number of hydrosols of synthetic resins have been prepared by various aqueous emulsion polymerization methods. For the most part, however, the prior art processes have entailed the use of a conventional type of surfactant which remains in the hydrosol such as sodium lauryl sulfate, sodium oleate, cetyl trimethyl ammonium chloride, etc. For certain applications, the presence of surfactants of this kind in a hydrosol is decidedly detrimental. This is particularly true where the hydrosol is intended for use as an additive to or substitute for gelatin as in relatively sensitive photographic emulsions and layers thereof. For example, many hydrosols prepared with the conventional surfactants have caused serious difficulties such as instability, graininess, etc. of emulsions intended for the preparation of certain photographic materials. It would be very desirable, therefore, to provide improved hydrosols of readily reproducible synthetic resins having properties similar to gelatin and highly compatible therewith, for addition to aqueous gelatin solutions or as substitutes for gelatin, but without any of the disadvantages of hydrosols prepared heretofore with the conventional surfactants.

I have now found that by copolymerizing mixtures of hydrophobic monomers such as an alkyl acrylate or methacrylate admixed with either a styrene or acrylonitrile (which mixtures of monomers normally give hydrophobic copolymers), in the presence of aqueous solutions of certain hydrophilic polymers and in the absence of any other surfactant, the hydrosols obtained are entirely free from the above-mentioned disadvantages of prior art materials and are particularly well adapted to add to gelatin or completely substitute gelatin in many photographic materials. I have found further that not all hydrophilic polymers will operate in the process of my invention to give satisfactory hydrosols. For example, hydrophilic polymers such as polyacrylic acid, polymethacrylic acid, copolymers of acrylamide-acrylic acid and copolymers of methacrylamide-methacrylic acid do not give satisfactory hydrosols with the above mentioned hydrophobic monomer mixtures, whereas hydrophilic copolymers of methacrylamide-acrylic acid give stable and highly satisfactory hydrosols with the mentioned hydrophobic monomer mixtures. Particularly useful hydrosols are obtainable by copolymerizing a mixture of n-butyl acrylate and styrene in the presence of an aqueous solution of methacrylamide-acrylic acid copolymer, the said hydrosols being characterized by excellent stability and compatibility in gelatin, and are outstanding for use with or without gelatin in a wide variety of photographic emulsions and layers thereof. However, the hydrosols of the invention must come within certain specified ranges of proportions of components to be operable and give the advantageous results set forth in the preceding.

It is, accordingly, an object of my invention to provide a new class of synthetic resin hydrosols. A further object is to provide such hydrosols which are devoid of any added surfactant other than the components making up the said resins. Another object is to provide hydrosols of the new class which can be substituted for gelatin solutions where gelatin solutions are now used. Another object is to provide hydrosols of the new class which are highly compatible with aqueous gelatin solutions, and which resulting mixtures can be coated out and dried to give layers of improved flexibility as compared with gelatin alone. Another object is to provide hydrosols of the new class which are especially useful in photographic materials and processes. Other objects will become apparent hereinafter.

In accordance with my invention, I first prepare a hydrophilic copolymer by heating a mixture consisting of water, a peroxide polymerization catalyst, methacrylamide and acrylic acid, in the proportions of from 20–80 parts by weight of methacrylamide to from 80–20 parts by weight of acrylic acid to obtain in the form of a viscous solution a copolymer consisting of from about 20–80% by weight of methacrylamide and from 80–20% by weight of acrylic acid. The preferred copolymers contain by weight from about 35–45% of methacrylamide and the remaining 65–55% of acrylic acid. At the lower range, i. e. 20% by weight of methacrylamide in the hydrophilic copolymer, the hydrosols prepared therefrom must be raised in pH to about 6.0 before compatibility with gelatin is achieved by mixing. In any case, after compatible mixing with gelatin, the pH of the resultant mixture can be varied from 4.0 to 9.0 without affecting compatibility. Satisfactory hydrosols cannot be prepared from hydrophilic copolymers of methacrylamide and acrylic acid outside the above-stated extreme range of 20–80% by weight of methacrylamide. The concentration of the monomers in water in the above process can vary in any practical range, for example, from about 2% to about 40%, but advantageously from about 10–30%, based on the total weight of the polymerization reaction mixture. The extent of the polymerizations is to substantial completion, i. e. where 95% or more of the monomers originally present have copolymerized. The hydrophilic copolymers obtained as viscous solutions contain the methacrylamide and acrylic acid in approximately the same ratio as present in the original starting mixture of monomers. These solutions have a limited period of stability. Their usefulness in the process of the invention passes after standing for 4 to 6 days at room temperature due to continued chemical reaction within the copolymer solution. Accordingly, these solutions are employed in the second polymerization step within this period, usually in diluted with water form. However, if these solutions are dried down to the copolymers or if the copolymers are isolated by precipitation and then dried, the copolymers are stable indefinitely in the dry state and may be conveniently redissolved in water when needed.

The viscous solutions of methacrylamide-acrylic acid copolymers prepared as above described are then subjected to a second and final step of polymerization wherein the mentioned hydrophobic monomer mixtures consisting of from 10–90% but preferably from 30–70% of the acrylic ester and from 90–10% but preferably from 70 to 30% by weight of a styrene or acrylonitrile are added to the viscous solutions, in the ratio of from 0.5 to 20 parts but preferably from about 2–20 parts by weight of the hydrophilic copolymer to from 99.5 to 80 parts but preferably from about 98–80 parts by weight of the hydrophobic monomer mixture, and the polymerization continued until the added monomers have substantially polymerized thereby producing the hydrosols of the invention. When proportions are employed outside the above stated ranges, satisfactory hydrosols are not obtained. The exact mechanism by which the hydrophilic copolymer functions in promoting combination with the hydrophobic monomers to form the stable hydrosols of the invention, which are compatible with gelatin or substitutes therefor, is not clearly understood. Accordingly, the exact structure of the hydrocols is not known. However, the interpolymer contained in the hydrosols functions in unitary form without separation of components so that the hydrosols can be considered as chemically bonded, resinous combinations of both hydrophilic and hydrophobic units.

The polymerizations according to the invention may be accelerated by heat, by actinic light such as ultraviolet, but preferably by the use of peroxide polymerization catalysts such as acetyl peroxide, benzoyl peroxide, hydrogen peroxide, sodium persulfate, potassium persulfate, ammonium persulfate, sodium perborate, potassium borate, and the like. The water-soluble catalysts such as potassium and sodium persulfates are preferred. Mixtures of catalysts can be employed. The amount of catalyst can be varied advantageously from about 0.01 to 2.0%, based on the total weight of monomers to be polymerized. The catalyst can be added in the first step of polymerization in sufficient amount to catalyze the second step also, but usually a portion of the catalyst is added for each step of polymerization. The temperature of the polymerizations in both steps can be varied from about 30° to 100° C., and even higher if pressures above atmospheric are employed, but preferably from about 75° to 90° C. Pressures less than atmospheric can also be employed. The process may be conducted in batch or continuous manner. Where a continuous process is employed, the monomers and substituents making up the reaction mixture in either step of polymerization can be added to the reaction mixture in continuous manner and the resulting products withdrawn from the system as formed. A preferred practice for preparing the hydrosols of the invention as illustrated by Example 1 is to make up an aqueous solution of methacrylamide, acrylic acid and potassium persulfate and heat the solution on a steam bath until a clear, viscous solution of the hydrophilic copolymer of methacrylamide and acrylic acid is obtained. The solution is usually diluted with water to facilitate further handling in the succeeding operation. Part of the diluted solution is placed in a flask and heated on the steam bath to 80°–90° C. Additional catalyst can be added, if desired. While stirring the solution in the flask, there are added slowly and concurrently thereto the separated portion of the hydrophilic copolymer solution through one funnel and a mixture of n-butyl acrylate and styrene through another funnel. After the addition has been completed, the polymerization is allowed to continue until the added monomers have substantially polymerized to form the hydrosol. The cooled and filtered hydrosol prepared by this procedure contains no coagulum and shows good compatibility with gelatin over the pH range of 4.0 to 9.0 and gives clear, flexible coatings on surfaces when dried. In the above described preferred process, the simultaneous addition of part of the hydrophilic copolymer solution and the mixture of monomers is for the purpose of providing fresh polymer loci to which the hydrophobic monomers can attach to in polymerizing. Addition of the full amount of monomers to the full amount of copolymer solution appears to exhaust too quickly all the copolymer loci so that the hydrosols obtained though useful are not quite as uniform and satisfactory for photographic purposes as those obtained by the above described simultaneous addition process.

The following examples will serve further to illustrate the manner whereby I practice my invention.

*Example 1*

A solution of 20 g. of methacrylamide, 30 g. of acrylic acid and 0.63 g. of potassium persulfate in 200 cc. of distilled water was heated on a steam bath for 3 hours. At this point, the polymerization of the monomers was substantially complete. The clear, viscous solution formed contained the hydrophilic copolymer of methacrylamide and acrylic acid in the approximate proportions that these components were present in the starting polymerization mixture. The viscous solution was diluted with 200 cc. of distilled water and divided into two equal parts. One part was placed in a 2-liter three-necked flask equipped with a stirrer, a thermometer and two dropping funnels, and diluted with 600 cc. of distilled water and heated on a steam bath to about 80° C. Then 1.27 g. of potassium persulfate was added. Into the two dropping funnels were place, respectively, the other part of the polymer solution and a mixture of 143 g. of n-butyl acrylate and 61 g. of styrene. The contents of the dropping funnels were added simultaneously, dropwise with stirring, over a period of 35 minutes, to the reaction flask. The mixture in the flask was kept at 80°–82° C. during the polymer solution and monomer addition, and at 80°–85° C. for one hour thereafter. At this point, the added monomers had substantially completely polymerized. The hydrosol which had formed was cooled and filtered through a cloth filter. The opaque hydrosol contained no coagulum, was stable and was compatible with blended gelatin over the pH range of 4.0 to 9.0. Coatings made from the hydrosol and gelatin mixtures on drying gave clear, continuous films of improved physical properties over films formed with gelatin alone.

In place of the n-butyl acrylate in the above example, there can be substituted an equivalent amount of any of the mentioned acrylates such as methyl acrylate to give the corresponding hydrosol containing methyl acrylate, or ethyl acrylate to give the corresponding hydrogen containing ethyl acrylate, or propyl acrylate to give the corresponding hydrosol containing propyl acrylate. Also in place of the styrene in the above example, there can be substituted an equivalent amount of other styrenes such as α-methyl styrene, p-methyl styrene, o-chloro styrene, etc. to give the corresponding hydrosols containing these styrenes. These hydrosols all have the property of being compatible with gelatin, such mixtures when coated and dried giving clear and continuous films of improved physical properties as compared with films coated from solutions containing only gelatin.

*Example 2*

The procedure used in this example was exactly the same as that described in Example 1, except that the monomer combination used to prepare the hydrophilic copolymer solution consisted of 30 g. of methacrylamide and 20 g. of acrylic acid. The hydrosol obtained had properties similar to those of the hydrosol of Example 1.

*Example 3*

The procedure used was identical to that described in Example 1, except that the monomer combination used to prepare the hydrophilic copolymer solution consisted of 10 g. of methacrylamide and 40 g. of acrylic acid. The hydrosol obtained was not compatible with gelatin until it was raised to pH 6.0 with dilute ammonium hydroxide solution. Once compatibly mixed, the pH of the hydrosol-gelatin mixture could be varied from 4.0 to 9.0 without affecting compatibility.

*Example 4*

The procedure used was identical to that described in Example 1, except that the monomer combination used to prepare the hydrophilic copolymer solution consisted of 40 g. of methacrylamide and 10 g. of acrylic acid. The hydrosol obtained had properties similar to those of the hydrosol of Example 1.

*Example 5*

The procedure used was identical to that described in Example 1, except that the proportions used of n-butyl acrylate and styrene were 102 g. of n-butyl acrylate and 102 g. of styrene. The hydrosol obtained had properties similar to those of the hydrosol of Example 1.

*Example 6*

The procedure was identical to that described in Example 1, except that the proportions used of n-butyl acrylate and styrene were 61 g. of n-butyl acrylate and 143 g. of styrene. The hydrosol obtained had properties similar to those of the hydrosol of Example 1.

*Example 7*

The procedure was identical to that described in Example 1, except that the proportions used for preparing the hydrophilic polymer solution consisted of 10 g. of methacrylamide and 15 g. of acrylic acid, and the proportions of n-butyl acrylate and styrene were 160 g. of n-butyl acrylate and 69 g. of styrene. The hydrosol obtained had properties similar to those of the hydrosol of Example 1.

*Example 8*

A solution of 30 g. of methacrylamide, 20 g. of acrylic acid and 0.63 g. of potassium persulfate in 200 cc. of distilled water was heated on a steam bath for 3 hours. The clear, viscous solution obtained containing the formed copolymer of methacrylamide and acrylic acid was diluted with 200 cc. of distilled water and divided into two equal parts. One part was placed in a 2-liter three-necked flask equipped with a stirrer, a thermometer and two dropping funnels, and diluted with 600 cc. of distilled water and heated on a steam bath to about 80° C. Then 1.27 g. of potassium persulfate was added. Into the dropping funnels were placed, respectively, the other part of the solution of copolymer and a mixture of 143 g. of n-butyl acrylate and 61 g. of acrylonitrile. The contents of the dropping funnels were added simultaneously, dropwise with stirring, to the reaction mixture. The mixture in the flask was kept at 80°–82° C. during the addition of the copolymer solution and monomers, and at 80°–85° C. for one hour thereafter. The hydrosol which formed was cooled and filtered through a cloth filter. The opaque hydrosol contained no coagulum, was stable and was compatible with blended gelatin over the pH range of 4.0 to 9.0. However, coatings made from the hydrosol and gelatin mixtures dried into somewhat hazy, continuous films.

*Example 9*

The procedure used was identical to that described in Example 8, except that in place of the n-butyl acrylate and acrylonitrile, there were substituted 143 g. of ethyl acrylate and 61 g. of acrylonitrile. The hydrosol obtained had properties similar to those of the hydrosol of Example 8.

By proceeding as described in the above other satisfactory hydrosols can be prepared, for example, a hydrosol obtained by polymerizing 95 parts by weight of a mixture of 70% by weight of n-butyl acrylate and 30% by weight of styrene in the presence of 5 parts by weight of the methacrylamide-acrylic acid copolymer, a hydrosol obtained by polymerizing 97.5 parts by weight of a mixture of 50% by weight of n-butyl of styrene in the presence of 2.5 parts by weight of the methacrylamide-acrylic acid copolymer, a hydrosol obtained by polymerizing 99⅜ parts by weight of a mixture of 90% by weight of ethyl acrylate and 10% by weight of acrylonitrile in the presence of ⅝ parts by weight of the methacrylamide-acrylic acid copolymer, etc. Hydrosols having lower percentages of the hydrophilic copolymer also show good compatibility with gelatin as illustrated by the following examples.

*Example 10*

A hydrosol was prepared by the procedure of Example 1, except that in place of the monomers and the hydrophilic copolymer of Example 1, there were substituted 95 parts by weight of a monomer mixture consisting of 50% by weight of n-butyl acrylate and 50% by weight of styrene and 5 parts by weight of a methacrylamide-acrylic acid copolymer consisting of 40% by weight of methacrylamide and 60% by weight of acrylic acid. The hydrosol obtained was mixed with an equal amount of gelatin, based on the dry weights of the hydrosol and the gelatin and the homogeneous solution obtained was coated on a clear cellulose acetate film support and the coated film dried and conditioned at 77° F. and at a relative humidity of 15%. A clear film was obtained. The conditioned film on testing for flexibility in a standard type fold testing machine gave 26 folds without rupture, whereas a check film prepared by coating gelatin solution without any hydrosol, under exactly the same conditions of coating and conditioning and testing, gave only 10 folds before rupture. This result indicates that the flexibility of the gelatin layer was markedly improved by the presence of the hydrosol.

*Example 11*

A hydrosol was prepared by the procedure of Example 1, except that in place of the monomers and hydrophilic copolymer of Example 1, there were substituted 97.5 parts by weight of a monomer mixture consisting of 50% n-butyl acrylate and 50% styrene and 2.5 parts by weight of a methacrylamide-acrylic acid copolymer consisting of 40% by weight of methacrylamide and 60% by weight of acrylic acid. The hydrosol obtained was mixed with an equal amount of gelatin, based on the dry weights of the hydrosol and gelatin, and the homogeneous solution obtained was coated on a clear cellulose acetate film support and the coated film dried and conditioned at 77° F. and at a relative humidity of 15%. A clear film was obtained. The conditioned film on testing for flexibility in a standard type fold testing machine gave 30 folds without rupture, whereas a check film prepared by coating gelatin solution without any hydrosol, under exactly the same conditions of coating, conditioning and testing, gave only 10 folds before rupturing. This result indicates that the presence of the hydrosol in the gelatin solution markedly improved the flexibility of the resulting gelatin layer.

The hydrosols of the invention prepared as described in the preceding are particularly useful in photographic applications, either alone or in admixture with gelatin for backing layers on photographic films to prevent back reflection of light from the film support on exposure, as subbing layers for bonding the film support and emulsion layer together, in the photosensitive layer as carriers for the silver halide, as overcoating layers to protect the sensitized face of the photographic film, as materials for incorporation into light filter layers in photographic films, etc. In general, the hydrosols of my invention are of value for both color and black-and-white photographic applications. They are also useful as tub or beater size in photographic paper raw stock, in the baryta layer of certain photographic paper stock as adhesives, in sensitized emulsions employed for coating such paper stock, in overcoatings over sensitized paper emulsions, and the like.

What I claim is:

1. A process for preparing a hydrosol which is compatible with gelatin which comprises heating a mixture consisting of water, a peroxide polymerization catalyst, a copolymer consisting of from 20-80% by weight of methacrylamide and 80-20% by weight of acrylic acid and a mixture of monomers consisting of from 10-90% by weight of an alkyl acrylate, wherein the said alkyl group contains from 1 to 4 carbon atoms, and 90-10% of styrene, the said copolymer and the said mixture of monomers being present in the ratio of from 0.5 to 20 parts by weight of the said copolymer and to from 99.5 to 80 parts by weight of the said mixture of monomers.

2. A hydrosol obtained by the process of claim 1.

3. A process for preparing a hydrosol which is compatible with gelatin which comprises heating a mixture consisting of water, a peroxide polymerization catalyst, a copolymer consisting of from 20-80% by weight of methacrylamide and from 80-20% by weight of acrylic acid and a mixture of monomers consisting of from 10-90% by weight of n-butyl acrylate and from 90-10% by weight of styrene, the said copolymer and said monomers being present in the ratio of from 2-20 parts by weight of the said copolymer to from 98-80 parts by weight of the said monomers.

4. A process for preparing a hydrosol which is compatible with gelatin which comprises heating a mixture consisting of water, a peroxide polymerization catalyst, a copolymer consisting of from 20-80% by weight of methacrylamide and from 80-20% by weight of acrylic acid and a mixture of monomers consisting of from 10-90% by weight of ethyl acrylate and from 90-10% by weight of styrene, the said copolymer and said monomers being present in the ratio of from 2-20 parts by weight of the said copolymer to from 98-80 parts by weight of the said monomers.

5. A hydrosol obtained by the process of claim 4.

6. A process for preparing a hydrosol which is compatible with gelatin which comprises dividing a copolymer consisting of from 35-45% by weight of methacrylamide and from 65-55% by weight of acrylic acid in aqueous solution into a separated portion and a residual portion, heating the said residual portion and adding potassium persulfate thereto, and then gradually adding the said separated portion to the said residual heated portion concurrently with a mixture of monomers consisting of from 30-70% by weight of n-butyl acrylate and from 70-30% by weight of styrene, the said copolymer and the said monomers being present in the ratio of from 2-20 parts by weight of the said copolymer to from 98-80 parts by weight of the said monomers.

References Cited in the file of this patent

UNITED STATES PATENTS

| | | |
|---|---|---|
| 2,123,599 | Fikentscher et al. | July 12, 1938 |
| 2,133,257 | Strain | Oct. 11, 1938 |
| 2,476,527 | Barnes et al. | July 19, 1949 |
| 2,620,324 | Coover et al. | Dec. 2, 1952 |
| 2,653,140 | Allenby et al. | Sept. 22, 1953 |
| 2,666,042 | Nozaki | Jan. 12, 1954 |